United States Patent
Mariotto et al.

(10) Patent No.: US 12,549,071 B2
(45) Date of Patent: Feb. 10, 2026

(54) INTERNAL COOLING SYSTEMS FOR E-MACHINES WITH STATOR COOLING JACKETS AND COOLING IN SLOT

(71) Applicant: Airbus Operations S.L.U., Getafe (ES)

(72) Inventors: Damien Mariotto, Getafe (ES); Adrián Uriondo Del Pozo, Getafe (ES); Jose Manuel Cabañas Gutierrez, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 258 days.

(21) Appl. No.: 18/359,312

(22) Filed: Jul. 26, 2023

(65) Prior Publication Data

US 2024/0039368 A1     Feb. 1, 2024

(30) Foreign Application Priority Data

Jul. 28, 2022  (EP) .................................. 22382723

(51) Int. Cl.
    *H02K 9/197*    (2006.01)
    *H02K 3/24*     (2006.01)
    (Continued)

(52) U.S. Cl.
    CPC .............. *H02K 9/197* (2013.01); *H02K 5/203* (2021.01); *H02K 9/193* (2013.01); *H02K 3/24* (2013.01)

(58) Field of Classification Search
    CPC ............ H02K 5/20; H02K 9/19; H02K 9/193; H02K 9/197; H02K 5/203
    See application file for complete search history.

(56) References Cited

U.S. PATENT DOCUMENTS

| 7,176,593 B2 | 2/2007 | Galburt |
| 8,637,771 B1 * | 1/2014 | Yankie ..................... H02K 3/04 29/874 |

(Continued)

FOREIGN PATENT DOCUMENTS

| CN | 107919745 A | 4/2018 |
| CN | 210007491 U * | 1/2020 |

(Continued)

OTHER PUBLICATIONS

Nueschl (DE 102016119243 A1) English Translation (Year: 2018).*

(Continued)

*Primary Examiner* — Tulsidas C Patel
*Assistant Examiner* — Robert E Mates
(74) *Attorney, Agent, or Firm* — Greer, Burns & Crain, Ltd.

(57) ABSTRACT

An internal cooling system for an electric motor comprising a Drive End, DE, casing and a Non-Drive End, NDE casing, a stator with stator laminations and stator slots, head windings and stator slot winding turns, the internal cooling system comprising a first liquid cooling channel and a second liquid cooling channel, a periphery casing liquid cooling jacket connected to the first liquid cooling channel and to the second liquid cooling channel, DE and a NDE casing liquid cooling jackets configured to be established inside the DE and NDE casings, respectively, and connected to the first liquid cooling channel and to the second liquid cooling channel, respectively, and a slot-through liquid cooling jacket connected to the NDE and a DE casing liquid cooling jackets and configured to be established through the stator slots and in contact with the head windings and the stator slot winding turns to extract winding losses.

12 Claims, 2 Drawing Sheets

(51) Int. Cl.
  *H02K 5/20*       (2006.01)
  *H02K 9/193*      (2006.01)

(56) References Cited

U.S. PATENT DOCUMENTS

| | | | |
|---|---|---|---|
| 8,885,148 B2 | 11/2014 | Zordan | |
| 2002/0036440 A1* | 3/2002 | Shimada | H02K 1/30 310/91 |
| 2008/0018180 A1 | 1/2008 | Neal | |
| 2014/0241865 A1* | 8/2014 | Arimatsu | H02K 5/203 29/889 |
| 2020/0412193 A1* | 12/2020 | Eilenberger | H02K 11/25 |
| 2021/0281142 A1 | 9/2021 | Byltiauw | |

FOREIGN PATENT DOCUMENTS

| | | | | |
|---|---|---|---|---|
| DE | 102016119243 A1 * | 4/2018 | | H02K 1/20 |
| JP | H0951656 A | 2/1997 | | |
| JP | 2006325309 A | 11/2006 | | |
| JP | 5973724 B2 | 8/2016 | | |
| KR | 20200139482 A * | 12/2020 | | H02K 3/24 |

OTHER PUBLICATIONS

Lee (KR 20200139482 A) English Translation (Year: 2020).*
Yu (CN 210007491 U) English Translation (Year: 2020).*
European Search Report for corresponding European Patent Application No. 22382723.9 dated Jan. 20, 2023.
Y. Gai, et al., "Cooling of Automotive Traction Motors: Schemes, Examples, and Computation Methods" IEEE Transactions on Industrial Electronics, vol. 66, No. 3, Mar. 1, 2019.
Y. C. Chong, et al., "Review of Advanced Cooling Systems of Modern Electric Machines for EMobility Application" 2021 IEEE Workshop on Electrical Machines Design, Control and Diagnosis (WEMDCD) IEEE, Apr. 8, 2021; pp. 149-154.

* cited by examiner

INTERNAL COOLING SYSTEMS FOR E-MACHINES WITH STATOR COOLING JACKETS AND COOLING IN SLOT

CROSS-REFERENCES TO RELATED APPLICATIONS

This application claims the benefit of European Patent Application Number 22 382 723.9 filed on Jul. 28, 2022, the entire disclosure of which is incorporated herein by way of reference.

FIELD OF THE INVENTION

The present invention refers to an internal cooling system for an electric machine (e-machine) for aeronautical propulsion application that achieves increased performances thanks to the proposed internal cooling system.

Specifically, this invention focuses on internal cooling systems for permanent magnet synchronous machines where the losses are mainly located in conductors and stator laminations and the reduced losses are located in the rotor.

BACKGROUND OF THE INVENTION

The patent publication CN107919745A relates to a stator for an electric machine of a vehicle, the stator comprises a head winding, wherein the head winding has a plurality of windings. The windings of the head winding are cast with a potting material. This publication describes a cooling system using a periphery casing liquid cooling jacket in contact with stator laminations and impregnated head winding with cast material.

The mentioned cooling system comprises Non-Drive End (NDE) and a Drive-End (DE) casing liquid cooling jackets in contact with the impregnated head winding. The periphery casing liquid cooling jacket is used to extract stator laminations iron losses by conduction. The NDE and DE casing liquid cooling jackets are used to extract head winding losses.

In electrical motor (e-motors), to increase an e-machine performance, the cooling system has to be improved by reducing thermal resistances (e.g., using high thermal conductivity materials) and reducing the thermal path between the source and the thermal sink (casing liquid cooling jacket). This is not the case by the mentioned cooling system of CN107919745A.

Thus, the improved performances presented in the cooling system of CN107919745A are limited due to high temperature reached inside the slot by the conductors (i.e., winding turns) and due to the high thermal resistive path between those conductors and the casing liquid cooling jacket.

Hence, there is a demand to improve the known cooling system with respect to the management of the winding losses and the thermal resistive path. The present invention satisfies this demand.

SUMMARY OF THE INVENTION

The present invention relates to an internal cooling system for an electric motor (i.e. e-machine), in particular, for a Permanent Magnet Synchronous Machine (PMSM). The motor comprises a DE casing and a NDE casing, a stator with laminations and slots, motor winding comprising head windings (e.g., impregnated head windings) and winding turns in the stator slots (i.e., stator slot winding turns) and other conventional elements of an e-motor.

The purpose of the cooling system according to the present invention is to increase the e-machine figure of merit (i.e. power density and efficiency) thanks to the proposed internal cooling system which can extract the conductor losses via:

A periphery liquid cooling jacket in contact with the stator laminations to extract stator laminations iron losses and in contact with a high conductivity matrix encapsulating the head windings to extract head winding losses.

A slot-through liquid cooling jacket in contact with the stator slot winding, where the "heart" conductor losses are generated and with a high conductivity matrix encapsulating the head windings of the motor, where the "extremity" conductor losses are generated.

NDE and DE liquid cooling jackets also in contact with the high conductivity matrix encapsulating the head windings enabling to extract the "extremity" or "head" conductor losses with low electrical conductivity, (i.e., electrical insulation).

The proposed cooling system reduces thermal resistances (e.g., by using high thermal conductivity materials) and reduces the thermal path between the source and the thermal sink (e.g., by using a casing liquid cooling jacket in combination with a high conductivity matrix). Hence, the integrated and embodied cooling system in contact to the thermal sources (motor winding and iron material) enables to increase the figure of merit of an e-machine (i.e., power density and efficiency), and thus, it increases the e-machine performance.

The main aspect of the present invention relates to an internal cooling system for a motor comprising a DE casing and a NDE casing, a stator with laminations and slots, head windings and stator slot winding turns. The internal cooling system comprises a first liquid cooling channel "Cool IN" and a second liquid cooling channel "Cool OUT", a periphery casing liquid cooling jacket connected to the first liquid cooling channel "Cool IN" and to the second liquid cooling channel "Cool OUT". The periphery casing liquid cooling jacket can be configured to be in contact with the stator laminations to extract stator laminations iron losses and with a high conductivity matrix to extract head winding losses.

Furthermore, the internal cooling system comprises a DE and a NDE casing liquid cooling jackets configured to be established inside the DE and NDE casings, respectively, (axially or radially, in an encapsulated manner) and connected to the first liquid cooling channel "Cool IN" and to the second liquid cooling channel "Cool OUT", respectively. The DE and the NDE casing liquid cooling jackets are configured to be in contact with side surfaces of the head windings to extract head winding losses.

Furthermore, the internal cooling system comprises a slot-through liquid cooling jacket connected to the NDE and a DE casing liquid cooling jackets and configured to be in contact with the head windings and the stator slot winding turns to extract winding losses.

In some examples, the slot-through liquid cooling jacket is configured to be established through the stator slot winding turns when the motor comprises a concentrated winding configuration or to be established on a side of the stator slot winding turns when the motor comprises a distributed winding configuration.

The internal cooling system is configured to receive coolant, as e.g. liquid, via the first liquid cooling channel or via the second liquid cooling channel, distribute the liquid through the periphery casing liquid cooling jacket, the DE casing liquid cooling jacket, the NDE casing liquid cooling jacket and the slot-through liquid cooling jacket and expel the coolant via the second liquid cooling channel or the first liquid cooling channel (hence, providing a functionality).

In some examples, the first liquid cooling channel and/or the second liquid cooling channel have a circular shape.

In some examples, the periphery casing liquid cooling jacket has a spiral shape.

In some examples, the DE and the NDE casing liquid cooling jackets have a spiral shape and can be encapsulated inside the DE and NDE casings respectively, axially or radially.

In some examples, the internal cooling system further comprises a high thermal conductivity matrix in contact with the NDE and a DE casing liquid cooling jackets and the head windings and configured to extract head winding losses. The DE and NDE liquid cooling jackets can be in contact with the head windings through a high thermal conductivity matrix (resin, impregnation, epoxy, etc.). In some examples, the high thermal conductivity matrix comprises resin, impregnation, or epoxy.

In some examples, the internal cooling system comprising the periphery casing liquid cooling jacket, the NDE and a DE casing liquid cooling jackets and the slot-through liquid cooling jacket connected by the first and second liquid cooling channels "Cool IN" and "Cool OUT" comprise a small teeth square slots configuration associated with the high thermal conductivity matrix to increase the heat exchange surface and increase the thermal exchange between the cooling system and the motor head winding heat source.

In some examples, the first liquid cooling channel "Cool IN", the second liquid cooling channel "Cool OUT", the periphery casing liquid cooling jacket, the DE casing liquid cooling jacket, the NDE casing liquid cooling jacket and the slot-through liquid cooling jacket comprise metallic material such as aluminum, alumina ($Al_2O_3$), aluminum Nitride (AlN), stainless steel or titanium insulated with a polymer enamel coating or aramid paper or polyimide films or liners.

In the previous example, when the cooling system comprises metallic material, the cooling system can comprise a non-metallic barrier established in the slot-through liquid cooling jacket made of polyetheretherketone, polyetherketoneketone or carbon fiber to cut the electrical/magnetic path.

In some examples, the first liquid cooling channel "Cool IN", the second liquid cooling channel "Cool OUT", the periphery casing liquid cooling jacket, the DE casing liquid cooling jacket, the NDE casing liquid cooling jacket and the slot-through liquid cooling jacket comprise non-metallic and non-conductive electrically material such as BeO, silicon carbides (SSiC), silicon carbide reaction bonded (RBSiC), silicon nitride ($Si_3N_4$), polyetheretherketone polyetherketoneketone, epoxy, or carbon fiber.

A further aspect of the present invention relates to an electric motor comprising the internal cooling system according to the first aspect of the present invention.

Furthermore, the electric motor can comprise a shaft and a rotor, and wherein the shaft comprises fins to cool down the rotor by convection and thermal exchange with the internal cooling system.

In some examples, the electric motor comprises impregnated head windings having an impregnation of polyester or silicon epoxy resins.

In a first configuration of the electric motor, the internal cooling system comprises dielectric fluid such as mineral oil as coolant when the first liquid cooling channel "Cool IN", the second liquid cooling channel "Cool OUT", the periphery casing liquid cooling jacket, the DE casing liquid cooling jacket, the NDE casing liquid cooling jacket and the slot-through liquid cooling jacket comprise metallic material.

In another configuration of the electric motor, the internal cooling system comprises ethylene glycol water as coolant, when the first liquid cooling channel "Cool IN", the second liquid cooling channel "Cool OUT", the periphery casing liquid cooling jacket, the DE casing liquid cooling jacket, the NDE casing liquid cooling jacket and the slot-through liquid cooling jacket comprise non-metallic material.

BRIEF DESCRIPTION OF THE DRAWINGS

For a better understanding the above explanation and for the sole purpose of providing an example, some non-limiting drawings are included that schematically depict a practical embodiment.

DETAILED DESCRIPTION OF THE PREFERRED EMBODIMENTS

Figure 1:
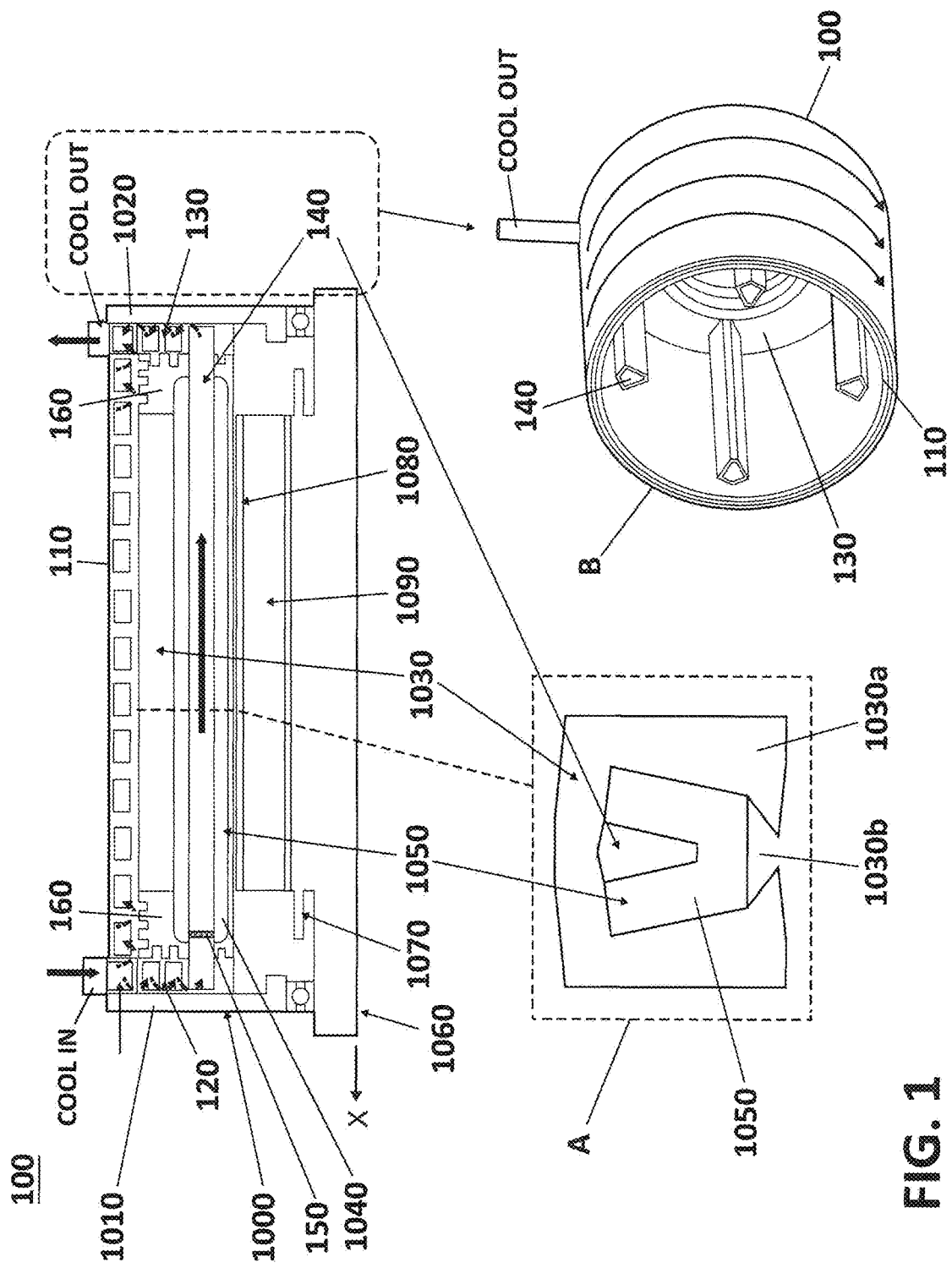
FIG. 1 shows an example of an internal cooling system according to the present invention established in an electric motor.

FIG. 1 shows the internal cooling system (100) according to the present invention established in an e-machine, in particular; in an electric motor (1000), as shown in the figure. The electric motor (1000) comprises a DE casing (1010) and a NDE casing (1020), a stator (1030) with stator laminations (1030a) and stator slots (1030b), head windings (1040) and stator slot winding turns (1050). Furthermore, conventional elements of the electric motor (1000) as e.g., a shaft (1060), fins (1070), magnets (1080), and a rotor (1090) are also shown in FIG. 1 to illustrate the reader.

The internal cooling system (100) comprises sub-systems or sub-channels that can be interconnected together through liquid cooling channels conducting liquid as coolant. In particular:

The internal cooling connection can be made by a first liquid cooling channel (cool IN) going into a first cooling subsystem or sub-channel, a second cooling subsystem and a third cooling subsystem and ending at a second liquid cooling channel (Cool OUT).

The internal cooling connection can also made by the second liquid cooling channel (Cool OUT) going into the first cooling subsystem or sub-channel, the second cooling subsystem and the third cooling subsystem, and ending at the first liquid cooling channel (Cool IN).

Hence, the proposed internal cooling system can function as a cooling system.

First Cooling Subsystem

The internal cooling system (100) comprises a first cooling subsystem comprising a periphery casing liquid cooling jacket (110) connected to the first liquid cooling channel (Cool IN) and to the second liquid cooling channel (Cool OUT). The periphery casing liquid cooling jacket (110) can be in contact with the stator (1030) of the electric motor (1000). In particular, the periphery casing liquid cooling jacket (110) can be in contact with stator laminations (1030a) where the iron losses are generated. Furthermore, the periphery casing liquid cooling jacket (110) can be in contact with a top surface of the head windings (1040) where the "extremity" conductor losses are generated.

Second Cooling Subsystem

The internal cooling system (100) comprises a second cooling subsystem comprising DE and NDE casing liquid cooling jackets (120, 130) configured to be established inside the DE and NDE casings (1010, 1020) of the electric motor (1000), respectively, and in an encapsulated manner (axially or radially). The DE and NDE casing liquid cooling jackets (120, 130) can be connected to the first liquid cooling channel (Cool IN) and to the second liquid cooling channel (Cool OUT), respectively. The DE and NDE casing liquid cooling jackets (120, 130) can be in contact with a side surface of the head windings (1040) where the "extremity" conductor losses are generated. The DE and NDE casing liquid cooling jackets (120, 130) can be configured to remove any local hot spots generated by the head windings (1040).

In this example, the contact between the DE and NDE casing liquid cooling jackets (120, 130) and the head windings (1040) surface can be improved with a high thermal conductivity matrix (160) to extract head winding losses.

Third Cooling Subsystem

The internal cooling system (100) further comprises a third cooling subsystem (which can be considered a continuation of the second cooling subsystem) comprising a slot-through liquid cooling jacket (140) connected to the NDE and a DE casing liquid cooling jackets (120, 130) in contact with the head windings (1040), where the "extremity" conductor losses are generated, and in contact with the stator slot winding turns (1050), where the "heart" conductor losses are generated.

Figure 2:
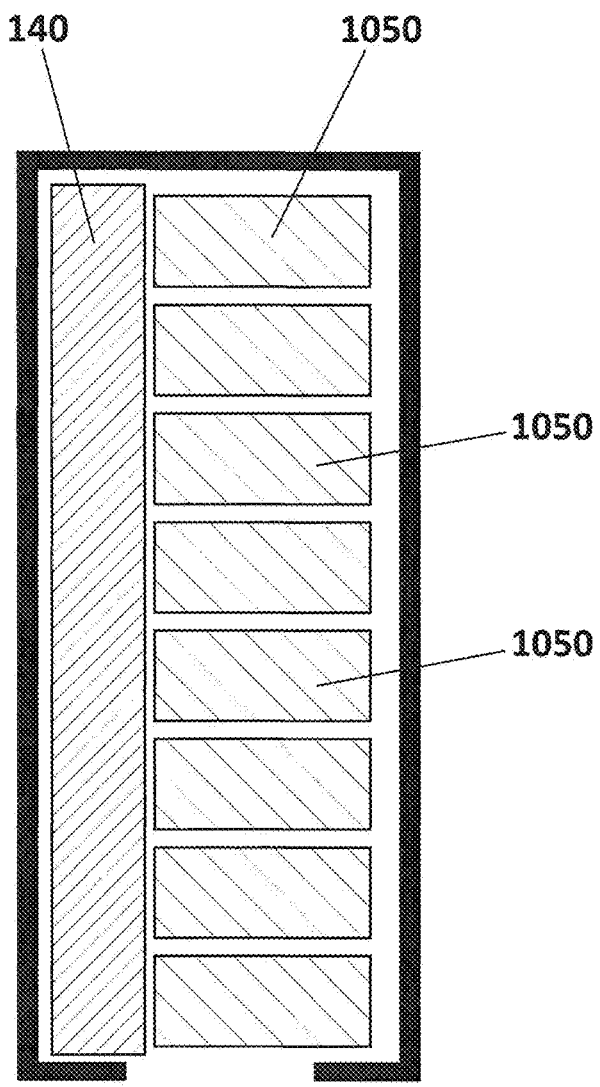
FIG. 2 shows a particular configuration of the slot-through liquid cooling jacket of the internal cooling system according to the present invention.

In the example of FIG. 1, the electric motor (1000) comprises a concentrated winding configuration. Hence, the slot-through liquid cooling jacket (140) can be established through the stator slot winding turns (1050), as shown in section A of FIG. 1. A second configuration for the slot-through liquid cooling jacket (140) is shown in FIG. 2.

Hence, the three cooling sub-systems (110, 120, 130, 140) can be interconnected together through liquid cooling channels forming the internal cooling system (100) as shown in the 3D representation (B) shown in FIG. 1.

In the example of FIG. 1, the internal cooling system (100) is configured to receive coolant, in particular liquid, via the first liquid cooling channel (Cool IN). The internal cooling system (100) is further configured to distribute the liquid through the periphery casing liquid cooling jacket (110) (i.e., e-motor periphery), the DE casing liquid cooling jacket (120), the NDE casing liquid cooling jacket (130) and the slot-through liquid cooling jacket (140) and expel the liquid through the second liquid cooling channel (Cool OUT).

The liquid (e.g., ethylene glycol water or mineral oil like silicon oil) can enter the e-machine internal cooling system (100) through the first liquid cooling channel (Cool IN) in the DE casing (1010) (or via the second liquid cooling channel (Cool OUT) in the NDE casing (1020) depending on integration of the internal cooling system (100) radially (as shown in FIG. 1) or axially in another configuration, and go in two parallel paths:

The connection is made by one circular channel (cool IN) going into two paths or sub-channels, i.e., the casing liquid cooling jacket (110) and the DE casing liquid cooling jacket (120). Each sub-channel can be shaped in spiral, so the heat exchange surface is maximized between the heat source and the internal cooling system (100).

First path: In the example of FIG. 1, the periphery casing liquid cooling jacket (110) can extend in the X axis in a spiral shape (i.e., circular around the X axis) towards the NDE casing liquid cooling jacket (130), where it can reconnect into the second liquid cooling channel (Cool OUT) which can have a circular shape.

Second path: In the example of FIG. 1, the DE casing liquid cooling jacket (120) can extend in the Y axis in a spiral shape inside the DE casing (1010) (which can be circular around the x axis) and then it can connect in serial into the slot-through liquid cooling jacket (140) and then into the NDE casing liquid cooling jacket (130). Finally, the DE casing liquid cooling jacket (120) can reconnect into the second liquid cooling channel (Cool OUT) which can have a circular shape.

Finally, the internal cooling system (100) can be configured to expel the liquid via the second liquid cooling channel (Cool OUT).

In another example, the internal cooling system (100) is configured to receive liquid via the second liquid cooling channel (Cool OUT). The internal cooling system (100) is configured to distribute the liquid through the periphery casing liquid cooling jacket (110) (i.e., e-motor periphery), the DE casing liquid cooling jacket (120), the NDE casing liquid cooling jacket (130) and the slot-through liquid cooling jacket (140). Finally, the internal cooling system (100) can be configured to expel the liquid via the first liquid cooling channel (Cool IN).

The sub-systems of the e-machine internal cooling system (100) can have small teeth square slots configuration (as shown on FIG. 1) in combination with the high thermal conductivity matrix (160) to increase the heat exchange surface and increase the thermal exchange between the internal cooling system (100) and the head winding heat source.

In the example of FIG. 1, the shaft (1060) of the electric motor (1000) can comprise fins (1070) to mix the internal motor flow coming from the exterior of the electric motor (1000) (depending on the motor closure from environmental or safety or EMH (efficient market hypothesis) standpoint) and to cool down the rotor (1090) by convection and thermal exchange with the internal cooling system (100).

The slot-through cooling jacket (140) could be established for example in the middle of stator slot winding turns (1050) in case of concentrated winding configuration (as shown in section A of FIG. 1) or on the side in case of distributed winding configuration (as shown in FIG. 2).

This internal cooling system (100) could be made in metallic material by Additive Layer Manufacturing or by a combination of machining and soldering. The material to be used could be aluminum, alumina ($Al_2O_3$), aluminum nitride (AlN), stainless steel or titanium (good volume to weight ratio) which may need to be insulated (e.g., polymer enamel coating, or aramid paper (e.g., Nomex), or polyimide films (e.g., Kapton), or liners (e.g., polyetheretherketone or polyetherketoneketone)) on the surface in contact with the winding.

Metallic material may cause an induced current inside the internal cooling system (100), creating leakage currents that can counteract the magnetic flux created by the winding due to the Lenz law. This could provoke a degraded effect on the coolant and material reliability. For that, it is convenient to cut the electrical and/or magnetic path via a non-metallic barrier (150) as shown in FIG. 1. The non-metallic barrier (150) can be e.g., polyetheretherketone, polyetherketoneketone or carbon fiber established in a hybrid design concept as shown in FIG. 1. The use of dielectric fluid as coolant (e.g., mineral oil) can be suitable for this type of configuration.

This internal cooling system (100) could be made non-metallic material, capable to withstand high T° C. and having high thermal conductivity while keeping a good volume to weight ratio and being non-conductive electrically, like e.g., BeO, silicon carbides (SSiC), silicon carbide reaction bonded (RBSiC), silicon nitride ($Si_3N_4$), polyetheretherketone, polyetherketoneketone, epoxy, carbon fiber etc.

For the impregnation of the winding, materials capable to withstand high T° C. and having high thermal conductivity while keeping a good volume to weight ratio, as polyester and silicon epoxy resins can be used.

FIG. 2 shows a particular configuration for the slot-through liquid cooling jacket (140) of the internal cooling system (100) according to the present invention. In this particular configuration, the slot-through cooling jacket (140) can be established on a side of the stator slot winding turns (1050) when the electric motor (1000) comprises a distributed winding configuration.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal cooling system for an electric motor comprising a Drive End (DE) casing, a Non-Drive End (NDE) casing, a stator with stator laminations and stator slots, a motor winding comprising head windings and stator slot winding turns in the stator slots, the internal cooling system comprising:
   a first liquid cooling channel and a second liquid cooling channel configured to receive or expel a liquid;
   a periphery casing liquid cooling jacket connected to the first liquid cooling channel and to the second liquid cooling channel, the periphery casing liquid cooling jacket configured to be in contact with the stator laminations to extract stator laminations iron losses and with a top surface of the head windings to extract winding losses,
   DE and NDE casing liquid cooling jackets configured to be established inside the DE and NDE casings, respectively, and connected to the first liquid cooling channel and to the second liquid cooling channel, respectively,
   wherein the DE and the NDE casing liquid cooling jackets are configured to be in contact with side surfaces of the head windings to extract winding losses; and
   a slot-through liquid cooling jacket connected to the DE and the NDE casing liquid cooling jackets and configured to be in contact with the head windings and the stator slot winding turns to extract winding losses, and
   wherein the internal cooling system is configured to:
      receive the liquid via the first liquid cooling channel and expel the liquid via the second liquid cooling channel; or
      receive the liquid via the second liquid cooling channel and expel liquid via the first liquid cooling channel; and
      distribute the liquid through the periphery casing liquid cooling jacket, the DE casing liquid cooling jacket, the NDE casing liquid cooling jacket and the slot-through liquid cooling jacket,
   wherein the first liquid cooling channel, the second liquid cooling channel, the periphery casing liquid cooling jacket, the DE casing liquid cooling jacket, the NDE casing liquid cooling jacket and the slot-through liquid cooling jacket comprise metallic material insulated with a polymer enamel coating or aramid paper or polyimide films or liners.

2. The internal cooling system according to claim 1, wherein the first liquid cooling channel, the second liquid cooling channel, or both have a circular shape.

3. The internal cooling system according to claim 1, wherein the periphery casing liquid cooling jacket has a spiral shape.

4. The internal cooling system according to claim 1, wherein the DE and the NDE casing liquid cooling jackets have a spiral shape and are configured to be encapsulated axially or radially inside the DE and NDE casings, respectively.

5. The internal cooling system according to claim 1, wherein the slot-through liquid cooling jacket is configured:
   to be established through the stator slot winding turns when the electric motor comprises a concentrated winding configuration; or
   to be established on a side of the stator slot winding turns when the electric motor comprises a distributed winding configuration.

6. The internal cooling system according to claim 1, further comprising:
   a high thermal conductivity matrix configured to be in contact with the NDE and DE casing liquid cooling jackets and the head windings of the electric motor,
   wherein the high thermal conductivity matrix is configured to extract head winding losses.

7. The internal cooling system according to claim 6, wherein the high thermal conductivity matrix comprises resin, impregnation or epoxy.

8. The internal cooling system according to claim 6, wherein the periphery casing liquid cooling jacket, the NDE and the DE casing liquid cooling jackets and the slot-through liquid cooling jacket comprise a small teeth square slots configuration in combination with the high thermal conductivity matrix to increase a heat exchange surface.

9. The internal cooling system according to claim 1, further comprising:
   a non-metallic barrier in the slot-through liquid cooling jacket to cut an electrical path, a magnetic path, or both.

10. An electric motor comprising:
   a internal cooling system comprising:
      a first liquid cooling channel and a second liquid cooling channel configured to receive or expel a liquid;
      a periphery casing liquid cooling jacket connected to the first liquid cooling channel and to the second liquid cooling channel, the periphery casing liquid cooling jacket configured to be in contact with stator laminations to extract stator laminations iron losses and with a top surface of head windings to extract winding losses,
      drive end (DE) and non-drive end (NDE) casing liquid cooling jackets configured to be established inside DE and NDE casings, respectively, and connected to the first liquid cooling channel and to the second liquid cooling channel, respectively, wherein the DE and the NDE casing liquid cooling jackets are configured to be in contact with side surfaces of the head windings to extract winding losses; and a slot-through liquid cooling jacket connected to the DE and the NDE casing liquid cooling jackets and configured to be in contact with the head windings and stator slot winding turns to extract winding losses, and wherein the internal cooling system is configured to:
receive the liquid via the first liquid cooling channel and expel the liquid via the second liquid cooling channel; or receive the liquid via the second liquid cooling channel and expel liquid via the first liquid cooling channel; and distribute the liquid through the periphery casing liquid cooling jacket, the DE casing liquid cooling jacket, the NDE casing liquid cooling jacket and the slot-through liquid cooling jacket, the electric motor further comprising:
a shaft,
and a rotor, wherein the shaft comprises fins to cool down the rotor by convection and thermal exchange with the internal cooling system, wherein the liquid comprises a dielectric fluid as coolant, and wherein the first liquid cooling channel, the second liquid cooling channel, the periphery casing liquid cooling jacket, the DE casing liquid cooling jacket, the NDE casing liquid cooling jacket, and the slot-through liquid cooling jacket comprise a metallic material.

11. The electric motor according to claim 10, further comprising:
impregnated head windings having an impregnation of polyester or silicon epoxy resins.

12. The electric motor according to claim 10, wherein the electric motor comprises a Permanent Magnet Synchronous Machine.

* * * * *